United States Patent
Mayer et al.

(10) Patent No.: US 6,763,710 B2
(45) Date of Patent: Jul. 20, 2004

(54) METHOD AND DEVICE FOR MEASURING THE FLOW OF A FLUID

(75) Inventors: Felix Mayer, Zürich (CH); Andreas Martin Haeberli, Wetzikon (CH)

(73) Assignee: Sensirion AG, Zurich (CH)

(*) Notice: Subject to any disclaimer, the term of this patent is extended or adjusted under 35 U.S.C. 154(b) by 0 days.

(21) Appl. No.: 10/257,791

(22) PCT Filed: Apr. 20, 2001

(86) PCT No.: PCT/IB01/00689
§ 371 (c)(1),
(2), (4) Date: Oct. 17, 2002

(87) PCT Pub. No.: WO01/81872
PCT Pub. Date: Nov. 1, 2001

(65) Prior Publication Data
US 2003/0115952 A1 Jun. 26, 2003

(30) Foreign Application Priority Data
Apr. 25, 2000 (CH) .............................. 806/00

(51) Int. Cl.[7] .............................................. G01F 1/68
(52) U.S. Cl. .................................................. 73/204.11
(58) Field of Search ......................... 73/204.11, 204.27

(56) References Cited

U.S. PATENT DOCUMENTS

| | | | |
|---|---|---|---|
| 4,373,386 A | 2/1983 | Schuddemat et al. ......... | 73/189 |
| 4,680,963 A | 7/1987 | Tabata et al. .................. | 73/204 |
| 4,783,996 A | 11/1988 | Ohta et al. ............... | 73/204.17 |
| 5,406,841 A | 4/1995 | Kimura .................... | 73/204.26 |
| 5,533,412 A | 7/1996 | Jerman et al. ........... | 73/861.95 |
| 5,804,720 A | 9/1998 | Morimasa et al. ........ | 73/204.26 |
| 5,830,372 A | 11/1998 | Hierold .......................... | 216/2 |
| 6,526,823 B2 * | 3/2003 | Tai et al. .................. | 73/204.26 |
| 6,550,324 B1 * | 4/2003 | Mayer et al. ............. | 73/204.14 |
| 6,550,325 B1 * | 4/2003 | Inushima et al. ........ | 73/204.26 |

FOREIGN PATENT DOCUMENTS

| | | | |
|---|---|---|---|
| GB | 2199954 | 7/1988 | ............. G01K/7/02 |
| WO | WO9721986 | 6/1997 | ............. G01F/1/68 |
| WO | WO9836247 | 8/1998 | ........... G01F/1/684 |

OTHER PUBLICATIONS

Ashauer et al. "Thermal Flow Sensor for Liquids and Gases," Proceedings IEEE Micro Electro Mechanical Systems, IEEE Catalog No. 98CH36176, Jan. 25–29, 1998, Heidelberg, Germany.
Mayer et al. "Scaling of Thermal CMOS Gas Flow Microsensors: Experiment and Simulation," Proceedings IEEE Micro Electro Mechanical Systems, IEEE Catalog No. 96CH35856, Feb. 11–15, 1996, San Diego, CA, USA.

* cited by examiner

Primary Examiner—Edward Lefkowitz
Assistant Examiner—T Miller
(74) Attorney, Agent, or Firm—Cooper & Dunham LLP; Donald S. Dowden

(57) ABSTRACT

To measure the flow in a liquid, the liquid (1) is led in a duct (2) along a flow sensor (3). The flow sensor (3) is integrated together with a processing and control circuit on a semiconductor substrate. It comprises a heating and, symmetrically thereto, two temperature sensors. The flow is determined from the temperature difference between the temperature sensors and/or from the power dissipation of the heating. For calibrating the sensor, a valve (4) is provided by means of which the duct (2) can be interrupted. This arrangement allows a flow measurement of high accuracy.

15 Claims, 2 Drawing Sheets

METHOD AND DEVICE FOR MEASURING THE FLOW OF A FLUID

CROSS REFERENCE TO RELATED APPLICATIONS

This application claims the priority of Swiss patent application 806/00, filed Apr. 25, 2001, the disclosure of which is incorporated herein by reference in its entirety.

BACKGROUND OF THE INVENTION

The invention relates to a flow sensor for liquids and a method for measuring the flow amount of a liquid.

STATE OF THE ART

A flow sensors for liquids is described in the following publication: M. Ashauer, H. Glosch, F. Hedrich, N. Hey, H. Sandmaier und W. Lang, "Thermal Flow Sensor for Liquids and Gases", IEEE Proceedings (98CH36176) des 11. internationalen Workshops "Micro Electro Mechanical Systems", 1998.

Flow sensors for liquids serve to measure the flow velocity of a liquid. In particular, there are thermal flow sensors, which comprise a heating element in thermal contact with the liquid and a temperature sensor. Since the flow velocity affects the thermal drain from the temperature sensor as well as the thermal distribution in the liquid, the signal measured by the temperature sensor depends on the flow velocity.

From the measuring results of flow sensors for liquids, it is possible to determine the flow amount of the liquid, i.e. the amount of liquid passing a measuring point.

SUMMARY OF THE INVENTION

Hence, it is a general object of the invention to provide a sensor of the type mentioned initially that can be manufactured easily and that is still accurate. It is also an object to provide a method of the type mentioned initially that allows a very accurate determination of the flow amount.

This object is achieved the flow sensor and the method according to the invention.

The most important components of the flow sensor, i.e. the temperature sensor and the heating element, are therefore arranged on a common semiconductor substrate together with a processing and control circuit. This makes manufacturing cheaper and reduces the susceptibility to noise.

Preferably, the flow sensor is provided with a cover layer for protecting the temperature sensor and the heating element. A cover layer of DLC (Diamond-Like Carbon) has been found to be especially suited because the same is characterized by high hardness and stability.

In order to calibrate the flow sensor, it is preferably provided with a valve, which is closed by the processing and control circuit for determining the parameters of the sensor under defined conditions.

In the method according to the invention, the liquid is led through a duct past a heating element. A measuring parameter is determined that depends on the power dissipated by the heating element or from a temperature in the duct at the heating element. This allows to detect the presence of gas bubbles, which makes it possible to account for the gas bubble in the flow amount and/or to issue a warning. By means of this a more accurate measuring result is achieved.

Preferably, upon presence of a gas bubble, the measurement of the flow amount, which corresponds to an integration of the flow velocity over time, is interrupted. It is also possible to determine the volume of the gas bubble from the current flow velocity of the liquid and a temporal length of the gas bubble. Hereby, "temporal length" is understood to be the time during which the presence of the gas bubble is detected by means of the measuring parameter.

If temperature sensors are provided before and after the heating element, not only the flow velocity of the liquid can be determined from their temperature difference, but also the flow velocity of the gas in a gas bubble. As the signals during a gas bubble are, however, substantially weaker, it is in this case not necessary to interrupt the integration for the flow amount during the presence of a gas bubble.

The device according to the invention and the method according to the invention are especially suited for determining small flow amounts, such as they have e.g. to be measured when administering medication or in process technology.

BRIEF DESCRIPTION OF THE DRAWINGS

Further embodiments, advantages and applications of the invention result from the dependent claims and the now following description referring to the figures, wherein:

DETAILED DESCRIPTION OF THE INVENTION

Figure 1:
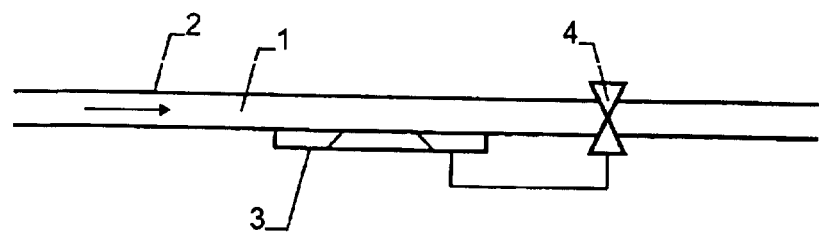
FIG. 1 is a schematic sectional view of an embodiment of the flow sensor according to the invention.

In FIG. 1, the basic design of a preferred embodiment of the invention is illustrated. The liquid 1 to be measured is led through a duct 2. A sensor element 3 is arranged in a wall in duct 2, in direct contact with liquid 1. Furthermore, a valve 4 is provided, by means of which duct 2 can be closed. Preferably, it is a valve based on bimetal.

Figure 2:
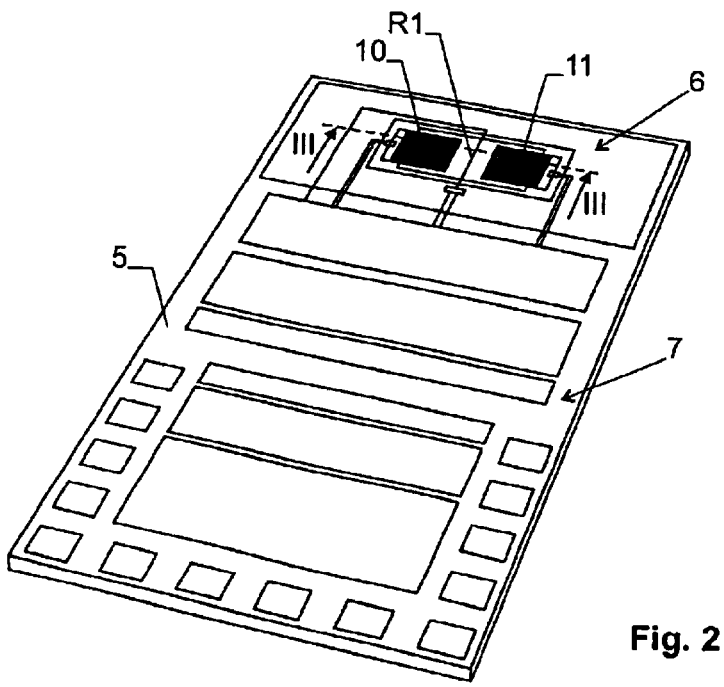
FIG. 2 is a sensor element on a semiconductor substrate.
Figure 3:
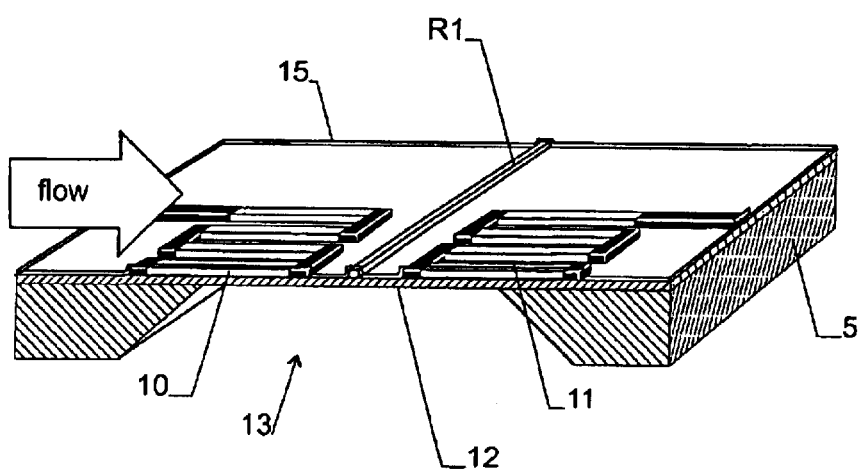
FIG. 3 is a schematical sectional view along line III—III of FIG. 2.

The design of sensor element 3 can be seen in FIGS. 2 and 3. It is integrated on a semiconductor substrate 5 and has a measuring section 6 and an electronic section 7.

Measuring section 6 forms a part of the wall of duct 2, such that the components arranged there are in thermal contact with liquid 1. It comprises are resistive heating R1, which is arranged symmetrically between two temperature sensors 10, 11 implemented as thermopiles. The thermopiles have contacts between polysilicon and aluminium and/or between differently doped polysilicon, such that they can be manufactured during an industrial CMOS process.

As it can especially be seen from FIG. 3, heating R1 is arranged on a membrane 12 extending over a recess or opening 13 of semiconductor substrate 5. Temperature sensor 10 measures the temperature difference between a zone of membrane 12 before heating R1 and the semiconductor substrate. Temperature sensor 11 measures the temperature difference between a zone of membrane 12 after heating R1 and the semiconductor substrate.

Arranging the temperature sensors 10, 11 and heating R1 on the membrane increased the reaction speed and sensitivity of the sensor. Depending on requirements, the recess or opening 13 may also be dispensed with such that the components lie directly over semiconductor substrate 5.

For chemically separating measuring section 6 from liquid 1, the former is covered by a cover layer 15. Cover layer 15 can consist of silicon oxide, silicon nitride or another suited material. Preferably, however, it consists of DLC (Diamond-Like Carbon). The design and production of layers of DLC is e.g. described by U. Müller, R. Hauert and M. Tobler in "Ultahartstoff-Beschichtungen aus Kohlenstoff", Oberflächen Werkstoffe April 1997.

Electronic section 7 comprises circuitry for controlling heating R1 and for processing the measured signals. It is preferably implemented in CMOS technology.

Figure 4:
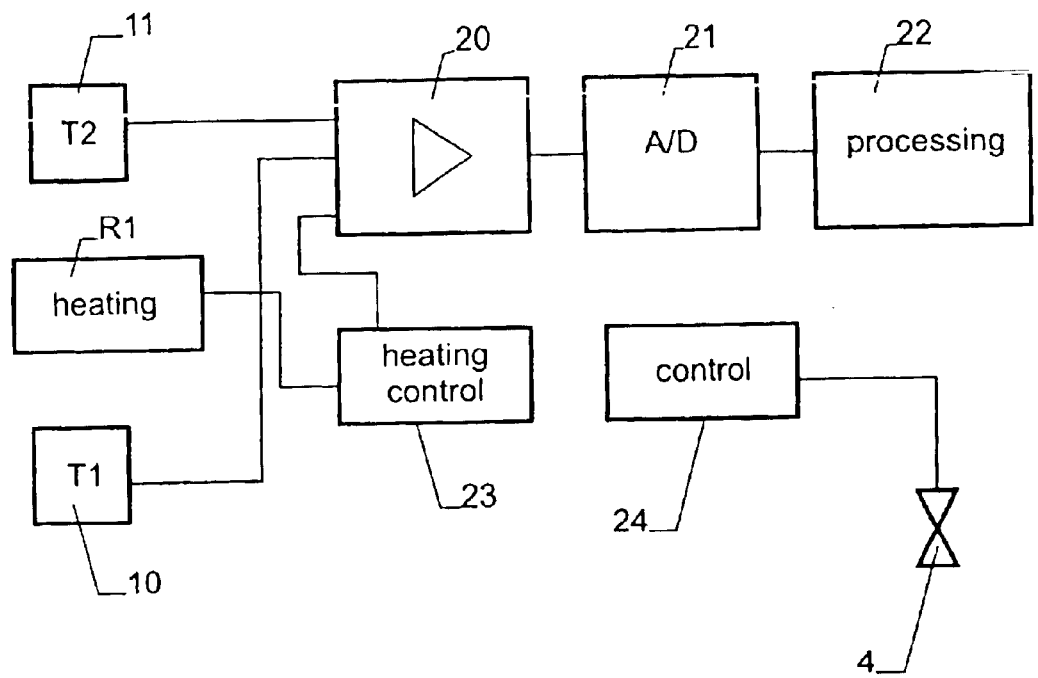
FIG. 4 is a block diagram of the flow sensor and FIG. 5 is a preferred embodiment of the heating control.

FIG. 4 shows a block diagram of the flow sensor. As can be seen therefrom, the measuring signals of the temperature sensors 10, 11 as well as an operation parameter of heating R1 depending on the power dissipation of heating R1 are fed to an amplifier stage 20, which selectively amplifies one or several of these signals. The amplified signals are digitized in an A/D-converter 21 and then linearized and offset corrected in a processing circuit 22.

For driving the heating R1, a heating control 23 is provided. For controlling the remaining functions, a control 24 is used.

Amplifier stage 20, A/D-converter 21, processing circuit 22, heating control 23 and control 24 are preferably all integrated in electronic section 7 of semiconductor substrate 5.

In normal operation of the flow sensor, valve 4 is open and the mass flow of the liquid is e.g. determined from the difference of the signals of the two heating sensors 10, 11, as it is e.g. known from the publication of M. Ashauer et al. mentioned initially.

For calibrating the flow sensor, valve 4 is closed by control 24. The remaining difference of the signals of the two temperature sensors 10, 11 is stored as offset and is subtracted from the measured signal in the following normal operation.

Figure 5:
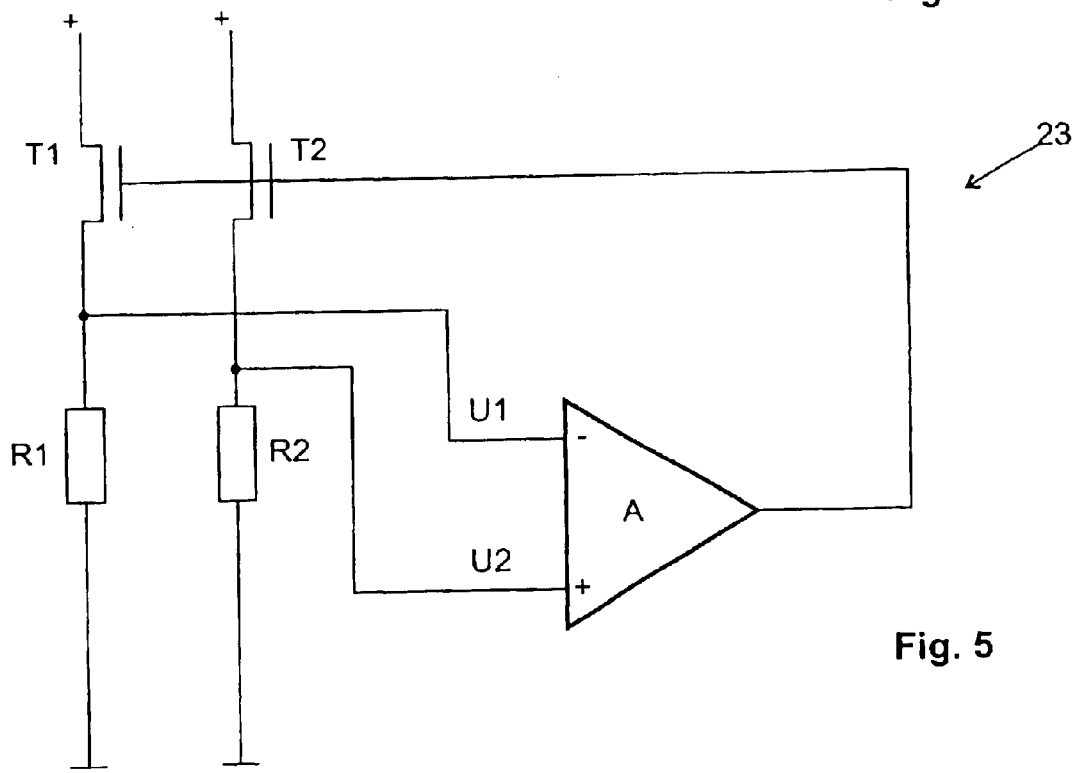

A preferred embodiment of heating control 23 is illustrated in FIG. 5. It comprises, besides heating R1, a reference resistor R2. Both resistors R1, R2 are made of the same material and designed as PTC resistors, i.e. their resistances increase with increasing temperature in the same degree and in substantially linear manner. The reference resistor is, however, not located on membrane 12 but on the semiconductor substrate 5. Geometrically, R1 and R2 differ in such a manner that the resistance of R1 at the same temperature is some percent smaller than the one of R2.

The two resistors R1, R2 are provided with identical or mutually proportional currents through two transistors T1, T2. The gate voltage of the transistors T1, T2 is generated by an operational amplifier A. The voltage U1 over R1 is fed to the inverting input of the operational amplifier A, the voltage U2 over R2 to the non-inverting input.

The circuit of FIG. 5 forms a feedback loop where the currents are regulated such that a fixed temperature difference is established between the two resistors R1 and R2.

This is due to the fact that operational amplifier A tries to keep the voltages U1 and U2 equal. This is the case if there is a fixed temperature difference between the two resistors R1 and R2, which is given by the temperature coefficient of the two resistors R1 and R2 and the difference of the resistor values.

As the temperature sensors 10, 11, because they are thermopiles, also measure temperatures relative to the substrate temperature, the circuit of FIG. 5 has the advantage that it makes the flow sensor in first approximation independent of the environmental temperature.

Furthermore, the circuit of FIG. 5 has the advantage that it prevents an overheating of the heating when there are gas bubbles in liquid 1. Due to the feedback loop the control voltage of the transistors T1, T2 decreases quickly during a gas bubble. The reaction time lies, due to the arrangement of heating R1 on the membrane 12, in the order of e.g. 2 milliseconds.

If the flow velocity of liquid 1 increases in normal operation, heating R1 looses more heat because of which the current through heating R1 increases automatically. Hence, the current through heating R1 (or its power dissipation or the output voltage of operational amplifier A) is also an operational parameter that depends on the flow velocity of liquid 1. In particular during high flow rates this parameter is well suited for a measurement of the flow. It is therefore also fed to preamplifier 20.

If the flow measurement is carried out by means of the heat loss of heating R1, heating R1 can serve, at the same time, as heating member and temperature sensor. In this case, the additional temperature sensors 10, 11 are not used.

Preferably, both measuring methods are combined. During low flow rates, primarily the signals of the temperature sensors 10, 11 are used, during higher flow rates a parameter depending on the heat loss of heating R1, e.g. the operational parameter mentioned above. A suited weighing or selection of the measuring methods is preferably made by processing circuit 22.

The processing circuit can use the flow rate measurement made by means of the temperature sensors 10, 11 for calibrating the measurement by means of the heat loss of heating R1. For this purpose the valve can be closed e.g. in temporal intervals, or it is waited until the flow reaches a rate that lies within the measuring range of temperature sensors 10, 11. Then, a measurement with good accuracy can be made by means of the temperature sensors 10, 11. The same is compared to the measuring result from the heat loss of heating R1, whereby the flow rate measurement by means of the heat loss can be calibrated.

Depending on the requirements it is, however, also possible to use only one of the measuring methods, or one of the other measuring methods described in the above mentioned publication of M. Ashauer et al. can be used.

For increasing the accuracy of the flow sensor, gas bubbles in liquid 1 can be taken account of. As already mentioned, the presence of a gas bubble can be determined by means of the above mentioned operational parameter. Usually, the presence of a gas bubble can also be detected by means of the temperature sensors 10, 11 because another temperature and temperature distribution is established in the duct during the passage a gas bubble.

When a gas bubble is detected and the flow amount is determined via the heat loss of heating R1, the measurement is interrupted during the presence of the heating, i.e. the flow velocity is not integrated during the passage of the bubble.

It is also possible to determine the volume of the gas bubble from the current value of the flow velocity and the time of passage of the gas bubble at the flow sensor, as well as from the cross section of duct 2.

The measurement of the flow amount by means of the temperature difference over the temperature sensors 10, 11 is to gas bubbles. Upon presence of a gas bubble, the temperature difference over the temperature sensors 10, 11 becomes very small, i.e. if no special measures are taken, the flow sensor assumes that the flow velocity has dropped nearly to zero. When determining the flow amount, i.e. when integrating the flow velocity over time, only a small or no contribution is made during the passage of the bubble.

During the presence of a gas bubble, it is also possible to measure in conventional manner the flow velocity of the gas inside the gas bubble by means of the temperature sensors 10, 11.

These operations can be carried out by processing circuit 22 or by an external processor.

It is also possible to merely generate a warning signal that indicates the presence of a gas bubble, without correcting the amount of flow.

The present flow sensor is suited for a measurement with liquids of all types. Its output signal can, depending on application, be the current flow amount (e.g. in liters per minute) or the flow integrated over time (e.g. in liters).

In the embodiment described above the processing and control circuit is integrated on the semiconductor substrate 5. It is, however, also possible to only arrange the heating and one or more temperature sensors on semiconductor substrate 5.

While, in the present application, preferred embodiments of the invention are described, it must be clearly understood that the invention is not limited thereto and can also be carried out in different manner within the scope of the following claims.

What is claimed is:

1. A flow sensor for liquids comprising a semiconductor substrate, a heating element arranged on said substrate in thermal contact with the liquid to be measured, temperature sensors arranged on said substrate in thermal contact with the liquid to be measured, wherein, in a flow direction, the temperature sensors are arranged before and after the heating element, and a processing and control circuit integrated on the semiconductor substrate for processing signals of the temperature sensors, wherein, at a relatively low flow velocity, the processing and control circuit is determines the flow velocity, solely or predominately from the temperature difference between the temperature sensors; and at a relatively high flow velocity, the processing and control circuit determines the flow velocity solely or predominately from a parameter depending on the power dissipation of the heating element.

2. The flow sensors for liquids of claim 1 further comprising a cover layer separating the temperature sensor and the heating element from the liquid.

3. The flow sensor for liquids of claim 2 wherein the cover layer consists of DLC.

4. The flow sensor for liquids of claim 1 wherein the processing and control circuit is designed in CMOS technology.

5. The flow sensor for liquids of claim 1 wherein the heating element serves as temperature sensor.

6. The flow sensor for liquids of claim 1 wherein the processing and control circuit is designed for calibrating, by means of the determination of the flow velocity from the temperature difference, the determination of the flow velocity from the power dissipation.

7. The flow sensor of claim 6 wherein the calibration takes place at a flow velocity of substantially zero.

8. The flow sensor for liquids of claim 1 further comprising two resistors with substantially equal temperature dependence arranged on the semiconductor substrate, wherein a first one of the resistors is the heating element and a second one of the resistors is a reference resistor, and further comprising a feedback loop that regulates the power through the first resistor such that, between the resistors, a fixed temperature difference is established.

9. The flow sensor for liquids of claim 8 wherein the resistors are PTC-resistors and wherein the reference resistor at equal temperature is larger than the heating element such that, during operation, the heating element has a higher temperature than the reference voltage resistor.

10. The flow sensor of claim 8 wherein the feedback loop regulates the current in both resistors proportionally or equally.

11. The flow sensor for liquids of claim 1 wherein the heating element and at least one of the temperature sensor are arranged on a membrane, which extends over an opening or recess in the semiconductor substrate.

12. The flow sensor for liquids of claim 1 further comprising a valve that can be closed by the processing and control circuit for a calibration of the flow sensor.

13. The flow sensor for liquids of claim 1 wherein the temperature sensors are thermopiles.

14. The flow sensor of claim 13 wherein the thermopiles comprise contacts between polysilicon and aluminium and/or between differently doped polysilicon.

15. A flow sensor for liquids comprising a semiconductor substrate, a heating element arranged on said substrate in thermal contact with the liquid to be measured, temperature sensors arranged on said substrate in thermal contact with the liquid to be measured, wherein, in a flow direction, the temperature sensors are arranged before and after the heating element, a processing and control circuit integrated on the semiconductor substrate for processing signals of the temperature sensors, wherein the processing and control circuit is designed for determining a first flow velocity from the temperature difference between the temperature sensors and for determining a second flow velocity from a parameter depending on the power dissipation of the heating element, and for determining a resulting flow velocity from a flow-rate dependent combination of the first and the second flow velocities.

* * * * *